(12) United States Patent
Rockwell et al.

(10) Patent No.: US 9,004,589 B2
(45) Date of Patent: Apr. 14, 2015

(54) VIBRATORY ALERT PATCH

(71) Applicant: Toyota Boshoku America, Inc., Novi, MI (US)

(72) Inventors: Christopher Mark Rockwell, Ann Arbor, MI (US); Douglas J. Krueger, Jr., Macomb, MI (US); Anup Viswanathan, Ann Arbor, MI (US); Daniel Jerome Wiegand, Macomb, MI (US)

(73) Assignee: Toyota Boshoku America, Inc., Novi, MI (US)

( * ) Notice: Subject to any disclaimer, the term of this patent is extended or adjusted under 35 U.S.C. 154(b) by 21 days.

(21) Appl. No.: 13/933,413

(22) Filed: Jul. 2, 2013

(65) Prior Publication Data

US 2014/0008948 A1    Jan. 9, 2014

Related U.S. Application Data

(60) Provisional application No. 61/667,614, filed on Jul. 3, 2012.

(51) Int. Cl.
*A47C 31/00* (2006.01)
*B60Q 9/00* (2006.01)
*B60N 2/00* (2006.01)
*B60N 2/44* (2006.01)

(52) U.S. Cl.
CPC ........ *B60Q 9/00* (2013.01); *B60N 2/002* (2013.01); *B60N 2/448* (2013.01); *B60N 2002/4485* (2013.01)

(58) Field of Classification Search
USPC ............... 297/216.3, 217.3, 217.1, 463.2; 340/425.5
See application file for complete search history.

(56) References Cited

U.S. PATENT DOCUMENTS

| | | | |
|---|---|---|---|
| 2,920,618 A | 1/1960 | Oster, Jr. | |
| 3,455,296 A | 7/1969 | McCaleb | |
| 5,647,633 A | 7/1997 | Fukuoka | |
| 6,682,494 B1 * | 1/2004 | Sleichter et al. | 601/57 |
| 6,744,370 B1 * | 6/2004 | Sleichter et al. | 340/576 |
| 7,439,507 B2 | 10/2008 | Deasy et al. | |
| 7,553,288 B2 * | 6/2009 | Cohen | 601/47 |
| 7,676,324 B2 | 3/2010 | Bae | |
| 7,681,949 B2 | 3/2010 | Nathan et al. | |
| 7,714,701 B2 * | 5/2010 | Altan et al. | 340/407.1 |
| 2004/0049323 A1 | 3/2004 | Tijerina et al. | |
| 2007/0241595 A1 | 10/2007 | Nathan et al. | |

(Continued)

FOREIGN PATENT DOCUMENTS

| | | |
|---|---|---|
| CN | 2907059 | 5/2007 |
| DE | 102007012132 A1 | 9/2008 |

(Continued)

OTHER PUBLICATIONS

International Search Report and Written Opinion for PCT Application No. PCT/US2013/049050 mailed on Nov. 4, 2013.

(Continued)

*Primary Examiner* — Philip Gabler
(74) *Attorney, Agent, or Firm* — Carlson, Gaskey & Olds, P.C.

(57) ABSTRACT

A seat cushion of a vehicle seat includes a cushion made of foam and at least one motor assembly located on or near an upper surface of the cushion. The at least one motor assembly includes a plurality of transducer cells.

21 Claims, 4 Drawing Sheets

(56) References Cited

U.S. PATENT DOCUMENTS

| | | |
|---|---|---|
| 2008/0055055 A1 | 3/2008 | Powell et al. |
| 2008/0128190 A1* | 6/2008 | Tsutsumi et al. ............. 180/219 |
| 2009/0015045 A1 | 1/2009 | Nathan et al. |
| 2009/0212974 A1* | 8/2009 | Chiba et al. ................. 340/932.2 |
| 2010/0049407 A1 | 2/2010 | Hijikata et al. |
| 2010/0231014 A1* | 9/2010 | Gibree et al. ............. 297/217.1 |
| 2011/0025109 A1* | 2/2011 | Ryczek et al. ............. 297/217.3 |

FOREIGN PATENT DOCUMENTS

| | | | |
|---|---|---|---|
| EP | 1927513 | A1 | 6/2008 |
| FR | 2889495 | A1 | 2/2007 |
| JP | 2007106211 | A | 4/2007 |
| JP | 2000225877 | A | 8/2008 |
| JP | 2009248631 | A | 10/2009 |
| JP | 2010111263 | A | 5/2010 |

OTHER PUBLICATIONS

International Preliminary Report on Patentability for International Application No. PCT/US2013/049050 mailed on Jun. 23, 2014.

Encapsulated Vibration Motors:: Pico Vibe™ Range, http://www.precisionmicrodrives.com/vibrating-vibrator-vibration-motors/encapsulated-vibration-motors.

Coin Vibration Motor:: Pico Vibe™ Range, http://www.precisionmicrodrives.com/vibrating-vibrator-vibration-motors/pancake-shaftless-coin-vibration-motors.

* cited by examiner

VIBRATORY ALERT PATCH

REFERENCE TO RELATED APPLICATIONS

The application claims priority to U.S. Provisional Application No. 61/667,614 filed on Jul. 3, 2012.

BACKGROUND OF THE INVENTION

A driver can be exposed to numerous audio and visual signals and stimuli during driving. If an event occurs while driving, an audio or visual alert can be generated to obtain the driver's attention. In one example, an event occurs when a sensor detects that a vehicle deviates from its lane. However, due to numerous other audio and visual signals and stimuli to which the driver is exposed, an audio or visual alert might not get the attention of the driver.

A tactile alert can be provided to alert the driver of an event. In one example, a motor located in a seat cushion vibrates when an event occurs to provide a tactile alert to the driver. Prior motors include a metal motor housing including portions that are secured together by fasteners.

SUMMARY OF THE INVENTION

A seat cushion of a vehicle seat includes a cushion made of foam and at least one motor assembly located on or near an upper surface of the cushion. The at least one motor assembly includes a plurality of transducer cells.

A vehicle seat assembly includes a cushion made of foam and at least one motor assembly located on or near an upper surface of the cushion. The at least one motor assembly includes a piece of fabric and a plurality of transducer cells encased within the piece of fabric to define a vibratory alert patch. The plurality of transducer cells are connected in series by wires, and the at least one motor assembly vibrates in response to a road event. The vehicle seat cushion assembly includes a sensor to detect the road event and a controller. The sensor sends a signal to the controller upon detection of a road event, and the controller sends another signal to the at least one motor assembly to cause the at least one motor assembly to vibrate.

These and other features of the present invention can be best understood from the following specification and drawings, the following of which is a brief description.

DETAILED DESCRIPTION OF THE PREFERRED EMBODIMENTS

Figure 1:
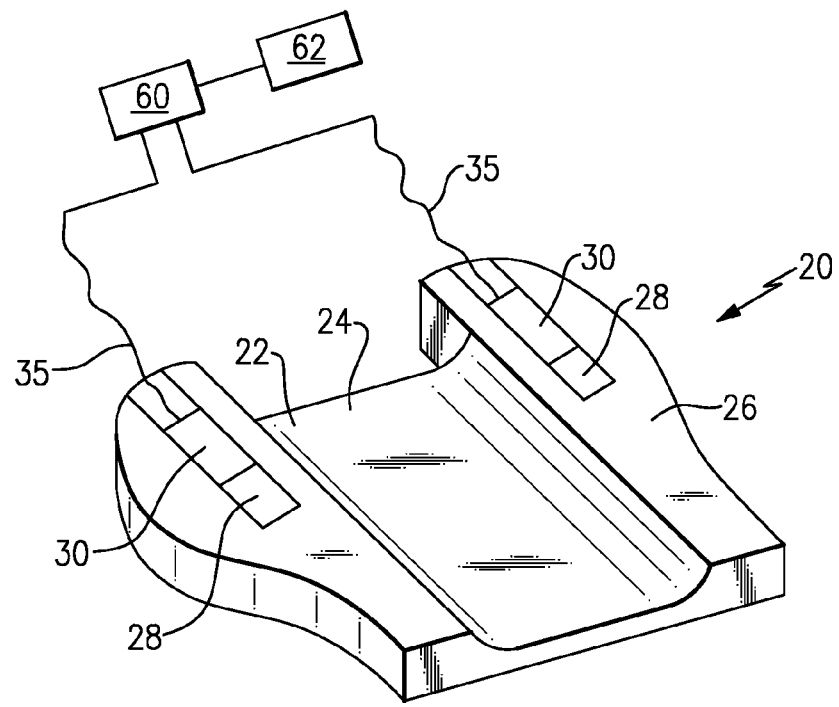
FIG. 1 illustrates a perspective view of a cushion of a vehicle seat.

FIG. 1 illustrates a cushion 20 of a vehicle seat 64. In one example, the vehicle seat 64 is a driver's seat. The cushion 20 is formed by a molding process and includes a seat portion 22 having a substantially flat upper surface 24 and two side bolsters 26 each located on one side of the seat portion 22. In one example, the cushion 20 is made of foam. In one example, the cushion 20 is made of polyurethane foam. The cushion 20 includes a pre-formed recess 28 formed during the molding process. In one example, each of the two side bolsters 26 include a pre-formed recess 28. A vibratory alert patch 30 that is a haptic motor is located on the cushion 20 in each of the pre-formed recesses 28.

Figure 2:
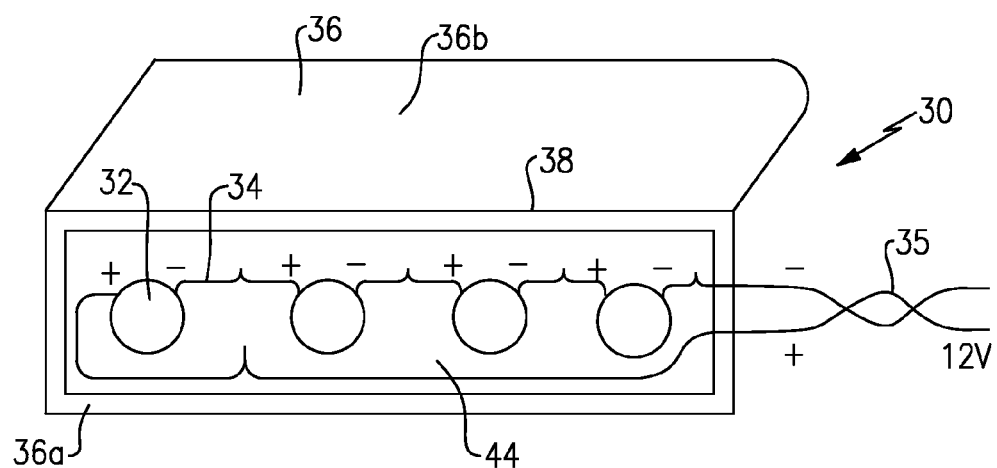
FIG. 2 illustrates internal components of a vibratory alert patch.

FIGS. 2 illustrates internal components of a haptic motor, for example a vibratory alert patch 30. The vibratory alert patch 30 includes an array of transducer cells 32. In one example, there are four transducer cells 32. In one example, the transducer cells 32 are each a Linear Resonant Actuator (LRA). In one example, the transducer cells 32 are each coin style transducer cells. Although a Linear Resonant Actuator is illustrated and described, the transducer cells 32 can each be a vibration surface transducer cell or an eccentrically rotating mass (ERM) motor.

The transducer cells 32 each have a voltage rating of about 2 V RMS. The transducer cells 32 have the same phase and frequency, and the vibration from each of the transducer cells 32 is added to a total vibration applied on the seat surface. In one example, the transducer cells 32 have a high G force rating. In one example, the transducer cells 32 have a G force rating of about 1.4 G.

In one example, the transducer cells 32 are connected in series by wires 34 to achieve a desired vibration alert. In another example, the transducer cells 32 are connected in parallel by wires 34 to achieve a desired vibration alert. The transducer cells 32 can also be connected in both series and parallel by wires 34 to achieve a desired vibration alert. The transducer cells 32 employ AC voltage at a specific frequency to generate the vibration resonance.

In one example, each transducer cell 32 has the same phase and frequency. The vibration alert of the transducer cells 32 are added together to define the desired vibration alert. The additive nature of the vibrations is affected by the spacing of the transducer cells 32. The nature of the vibrations can also be affected by the damping and stiffening of a flexible mounting medium 44, described below. In one example, the vibration alert is about 12 volts. In one example, the vibration alert is between about 9 volts to about 16 volts.

Figure 3:
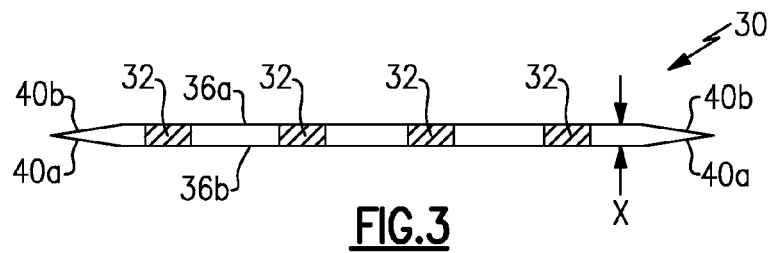
FIG. 3 illustrates a cross-sectional view of the vibratory alert patch.
Figure 4:
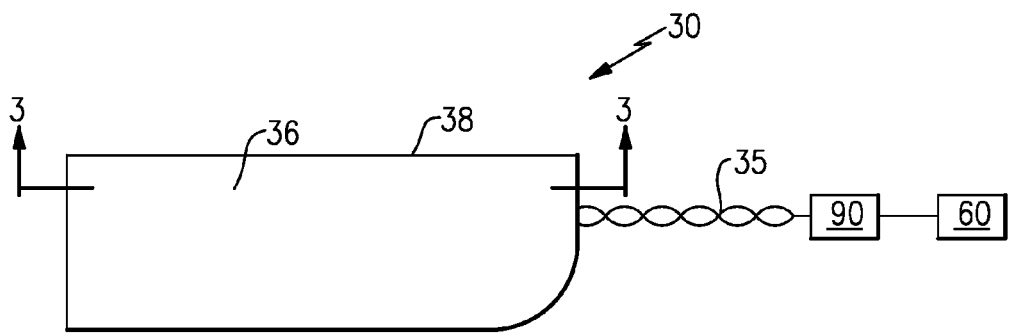
FIG. 4 illustrates a top view of a vibratory alert patch.

The transducer cells 32 are located between portions 36a and 36b of a piece of fabric 36. In one example, the piece of fabric 36 is polyester cloth. The piece of fabric 36 is folded along a fold 38 to define the portions 36a and 36b. As shown in FIG. 3, the portions 36a and 36b are secured to each by an adhesive to retain and completely encase the transducer cells 32 therebetween, as shown in FIG. 4. In one example, the adhesive is a polyester adhesive.

The vibratory alert patch 30 is thin and flexible, which allows adhesion directly on the molded cushion 20. In one example, the vibratory alert patch 30 has a thickness of about X ±/−1 mm. In one example, X is about 3 mm. Wires 35 extend out of the vibratory alert patch 30 for connection to a controller 60, as explained below.

In one example, instead of wires 34, the transducer cells 32 are mounted on a flexible mounting medium 44. In one example, the flexible mounting medium 44 is a printed circuit. In one example, the flexible mounting medium 44 is a polyester sheet. In one example, the mounting medium 44 is Mylar®, a registered trademark of E.I. Du Pont de Nemours and Company of Wilmington, Del.

In another example, the transducer cells 32 are encapsulated in a patch. In one example, the patch is made of rubber. By employing a patch, the transducer cells 32 can be located close to the occupant.

A microcontroller (not shown) sends out multiple output PWM (pulse width modulation) percentages signals that control motor driving circuitry (for example, outputs an AC signal at 175 Hz 2 V RMS) for each transducer cell 32 to provide a desired level of control. The system can produce haptic vibrations through a plurality of vibratory transducer arrangements and driving patterns.

Figure 5:
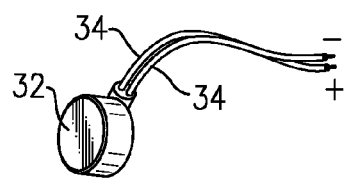
FIG. 5 illustrates a transducer cell of the vibratory alert patch.

In one example, each transducer cell 32 is a Precision Microdrives Precision Haptic Y-Axis Linear Resonant Actuator. FIG. 5 illustrates a Linear Resonant Actuator (LRA) including wires 34.

Figure 6:
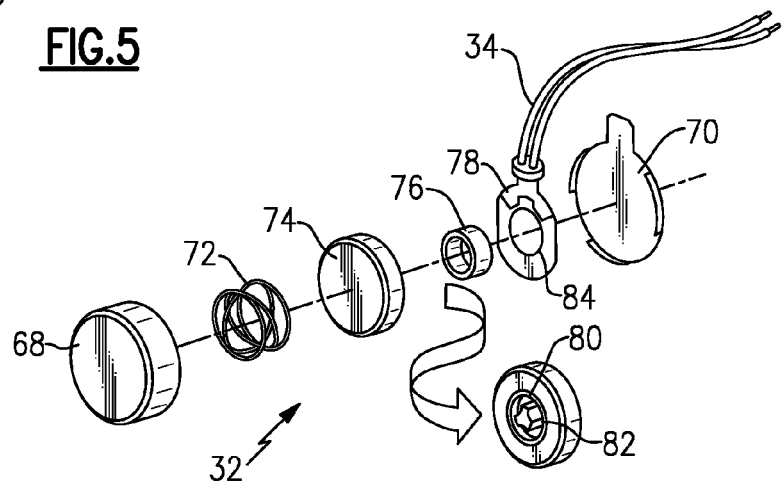
FIG. 6 illustrates an exploded view of the transducer cell of FIG. 5.

FIG. 6 illustrates an exploded view of the transducer cell 32 of FIG. 5. The transducer cell 32 (the Linear Resonant Actuator) includes a motor cover 68 and a motor chassis 70 that define the external body of the transducer cell 32. Contained within the motor cover 68 and the motor chassis 70 is a wave spring 72, a moving mass 74, a voice coil 76, and a flexible printed circuit board 78 (PCB) to which the wires 34 are attached that includes an opening 84. The voice coil 76 is received in the opening 84 of the printed circuit board 78. The moving mass 74 includes a voice coil yoke 80 and a NeFeB Neodymium magnet 82.

The Linear Resonant Actuator is driven by an AC signal through the wires 34. Current driven through the voice coil 76 produces a magnetic field, which causes the NeFeB Neodymium magnet 82 in the moving mass 74 to react to the voice coil 76, causing the moving mass 74 to move. The contact the wave spring 72 with the moving mass 74 creates a resonance effect that produces vibrations.

In one example, each transducer cell 32, or Linear Resonant Actuator of FIGS. 5 and 6 has the following parameters:

| SPECIFICATION | VALUE |
| --- | --- |
| Body Diameter (mm) | 10 |
| Body Length (mm) | 3.6 |
| Typical Operating Current (mA) | 69 |
| Typical Vibration Amplitude (G) | 1.4 |
| Typical Normalized Amplitude (G) | 1.4 |
| Rated Voltage (V RMS) | 2 |
| Related Resonant Frequency (Hz) | 175 |
| Lead Length (mm) | 100 |
| Lead Wire Gauge (AWG) | 32 |
| Lead Configuration | Straight |

Figure 7:
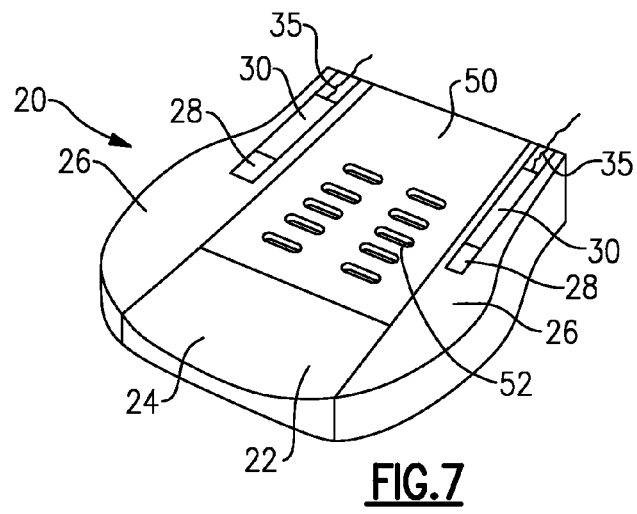
FIG. 7 illustrates a perspective view of the cushion with ventilation foam on an upper surface of the cushion.

FIG. 7 illustrates a perspective of the cushion 20 including two pre-formed recess 28 and a vibratory alert patch 30 located in each of the pre-formed recesses 28. Although only two pre-formed recess 28 and two vibratory alert patches 30 are illustrated and described, any number of vibratory alert patches 30 can be positioned on the cushion 20 in any location or configuration. A mat 50 can be located over the flat upper surface 24 of the seat portion 22 of the cushion 20. The mat 50 includes holes 52 that allow for ventilation. In one example, the mat 50 is made of polyester.

Figure 8:
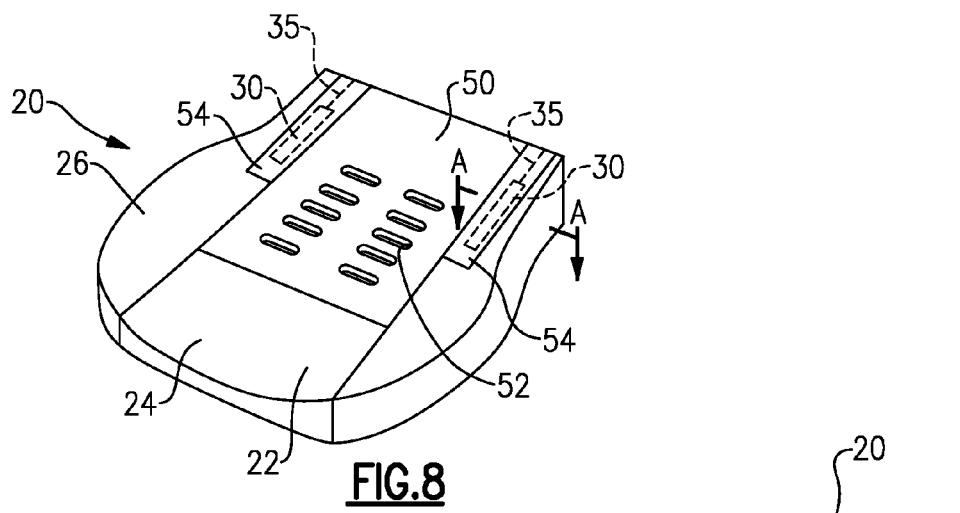
FIG. 8 illustrates a perspective view of foam placed over the vibratory alert patches.

FIG. 8 illustrates a perspective of the cushion 20 including a layer of foam 54 located over each of the two vibratory alert patches 30 on an exterior surface of the cushion 20. The layer of foam 54 provides additional cushioning to protect the two vibratory alert patches 30 and also prevents the two vibratory alert patches 30 from causing driver discomfort. In one example, each layer of foam 54 is made of polyurethane. In one example, the layer of foam 54 has a thickness of about Y $\pm/-1$ mm. In one example, Y is 5. In another example, the two vibratory alert patches 30 are embedded in the cushion 20 during the molding process near an upper surface of the cushion 20, and the layer of foam 54 is not needed.

Figure 9:
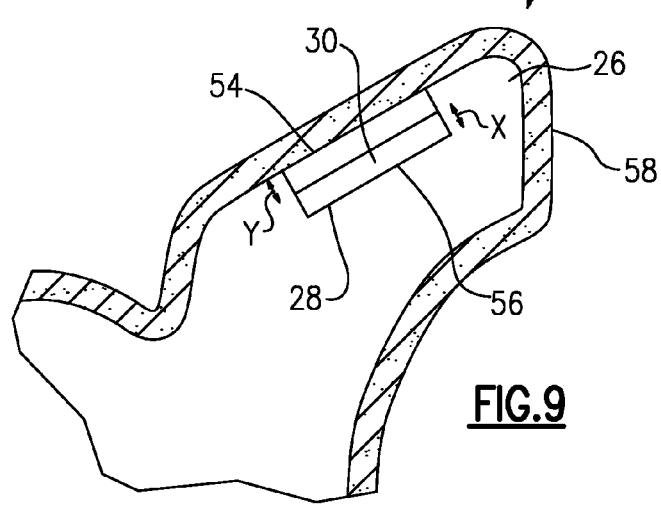
FIG. 9 illustrates a cross-sectional view of a side bolster of the cushion and the vibratory alert patch.

FIG. 9 shows a cross-sectional view of a side bolster 26 of the cushion 20 taken along line A-A of FIG. 8. An adhesive 56 can be employed to secure the vibratory alert patches 30 in the pre-formed recess 26. A trim cover 58 is located over the cushion 20 and provides an external surface of the vehicle seat 64 in which the driver sits while driving.

Returning to FIG. 1, the wires 34 allow for communication between the vibratory alert patch 30 and a controller 60. The controller 60 is also in communication with a sensor 62 that detects a road event. In one example, a road event occurs when the vehicle moves from its lane, another vehicle is approaching, a front collision occurs, or a rear collision occurs. When the sensor 62 detects a road event, a signal is sent to the controller 60. The controller 60 then sends a signal to the vibratory alert patch 30 in response to the signal from the sensor 62. In response to the signal from the controller 60, the vibratory alert patch 30 vibrates on the cushion 20 to provide a tactile signal and feedback that can be felt by the driver to alert the driver of the road event. In one example, the vibratory alert patch 30 vibrates above 50 m/s$^2$ as measured at a seat-occupant interface at approximately 175 Hz. By spacing the transducer cells 32, the sensing of vibrations can be increased.

In another example, the signal from the controller 60 can be amplified by an optional amplifier 90 (shown in FIG. 4) to power multiple devices. In another example, controller 60 can sent the signal at a less frequent interval to reduce the resonant vibration frequency.

Figure 10:
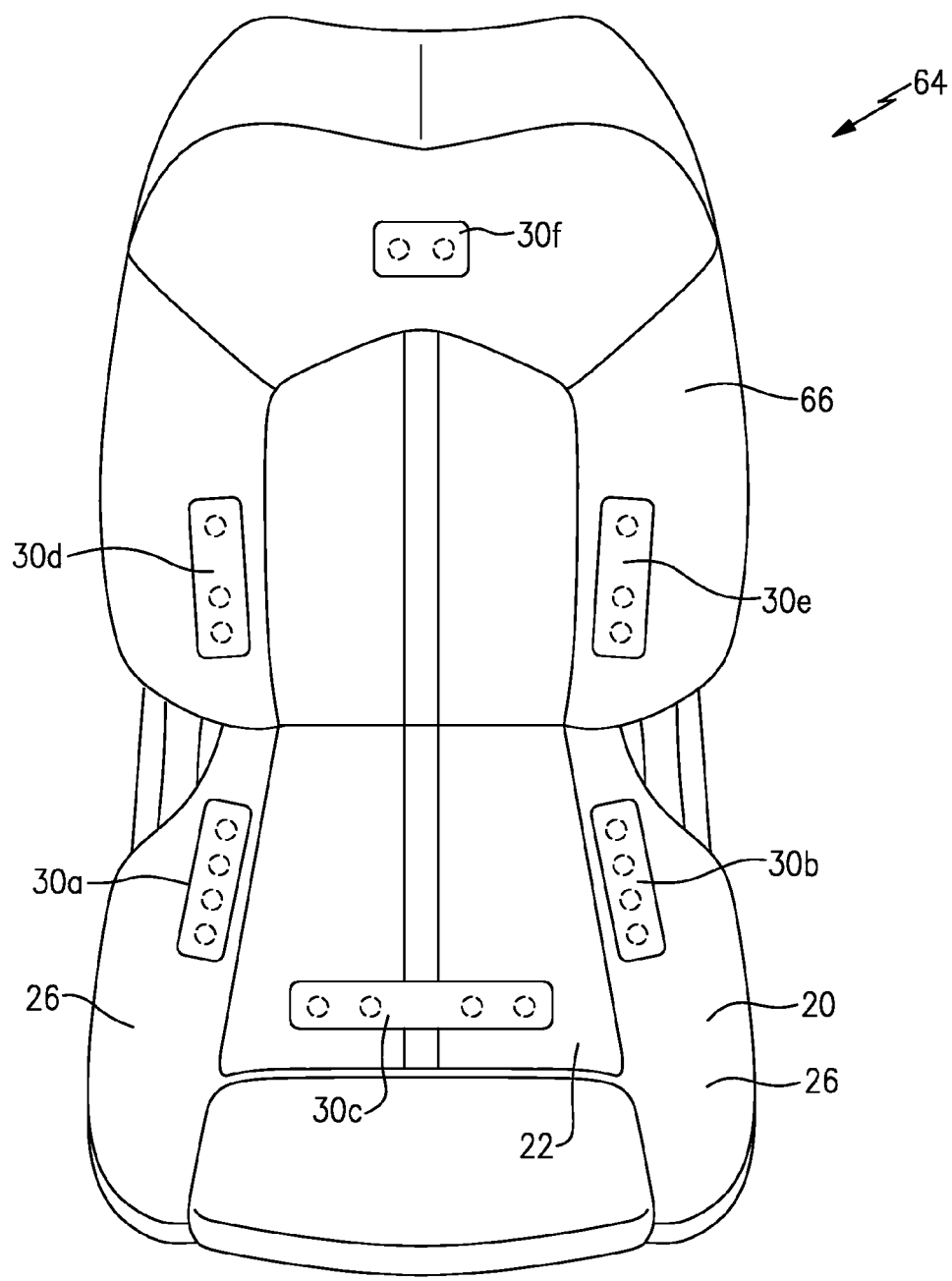
FIG. 10 illustrates a vehicle seat including an example configuration of vibratory alert patches.

FIG. 10 illustrate a vehicle seat 64 including the cushion 20 and a back rest 66 including six vibratory alert patches 30a, 30b, 30c, 30d, 30e and 30f. A vibratory alert patch 30a and 30b is each located on one of the two seat bolsters 26. A vibratory alert patch 30c is located over the seat portion 22 between the two seat bolsters 26. Three vibratory alert patches 30d, 30e and 30f are located on the back rest 66. The vibratory alert patches 30d and 30e are aligned with the vibratory alert patches 30a and 30b, respectively, on the side bolsters 26. The vibratory alert patch 30f is aligned with the vibratory alert patch 30c. FIG. 10 shows one example configuration or arrangements of vibratory alert patches 30. However, the vibratory alert patches 30 can be located in any configuration.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A seat cushion of a vehicle seat, the seat cushion comprising:
   a cushion made of foam, wherein the cushion has an upper surface; and
   at least one motor assembly located on or near the upper surface of the cushion, wherein the at least one motor assembly includes a plurality of transducer cells, wherein the at least one motor assembly includes a piece of fabric, and the plurality of transducer cells are encased within the piece of fabric to define a vibratory alert patch.

2. The seat cushion as recited in claim 1 wherein the cushion is made of polyurethane foam.

3. The seat cushion as recited in claim 1 wherein the cushion includes a seat portion having a substantially flat surface and a bolster on each side of the seat portion, the at least one motor assembly includes two vibration alert patches, and one of the two vibration alert patches is located on one of the bolsters.

4. The seat cushion as recited in claim 1 wherein the at least one motor assembly vibrates in response to a road event.

5. The seat cushion as recited in claim 4 wherein a sensor detects the road event, sends a signal to a controller upon detection of a road event, and the controller sends another signal to the at least one motor assembly to cause the at least one motor assembly to vibrate.

6. The seat cushion as recited in claim 1 wherein the plurality of transducer cells are connected in series by wires.

7. The seat cushion as recited in claim 1 wherein the plurality of transducer cells are linear resonant actuators.

8. The seat cushion as recited in claim 1 wherein the plurality of transducer cells generate combined voltage of about 9 to 16 volts.

9. The seat cushion as recited in claim 1 wherein the piece of fabric is polyester cloth.

10. The seat cushion as recited in claim 1 wherein the vibratory alert patch has a thickness of about 3 mm.

11. The seat cushion as recited in claim 1 wherein the plurality of transducer cells are mounted on a mounting medium.

12. The seat cushion as recited in claim 11 wherein the mounting medium is a polyester sheet.

13. The seat cushion as recited in claim 1 wherein a layer of foam is placed over the at least one motor assembly.

14. A vehicle seat assembly comprising:
a cushion made of foam, wherein the cushion has an upper surface;
at least one motor assembly located on or near the upper surface of the cushion, wherein the at least one motor assembly includes a piece of fabric and a plurality of transducer cells encased within the piece of fabric to define a vibratory alert patch, the plurality of transducer cells are connected in series by wires, and the at least one motor assembly vibrates in response to a road event;
a sensor to detect the road event; and
a controller, wherein the sensor sends a signal to the controller upon detection of a road event, and the controller sends another signal to the at least one motor assembly to cause the at least one motor assembly to vibrate.

15. The vehicle seat assembly as recited in claim 14 wherein the cushion is made of polyurethane foam.

16. The vehicle seat assembly as recited in claim 14 wherein the plurality of transducer cells are linear resonate actuators.

17. The vehicle seat assembly as recited in claim 14 wherein the piece of fabric is polyester cloth.

18. The vehicle seat assembly as recited in claim 14 wherein the vibratory alert patch has a thickness of about 3 mm.

19. The vehicle seat assembly as recited in claim 14 wherein a layer of foam is placed over the at least one motor assembly.

20. The seat cushion as recited in claim 1 wherein the piece of fabric is a single unitary piece of fabric.

21. The seat cushion as recited in claim 1 wherein the plurality of transducer cells are completely encased by the piece of fabric.

* * * * *